J. M. BLANCHARD.
LEVER BRAKE LOCK.
APPLICATION FILED FEB. 28, 1916.
1,185,618.
Patented June 6, 1916.
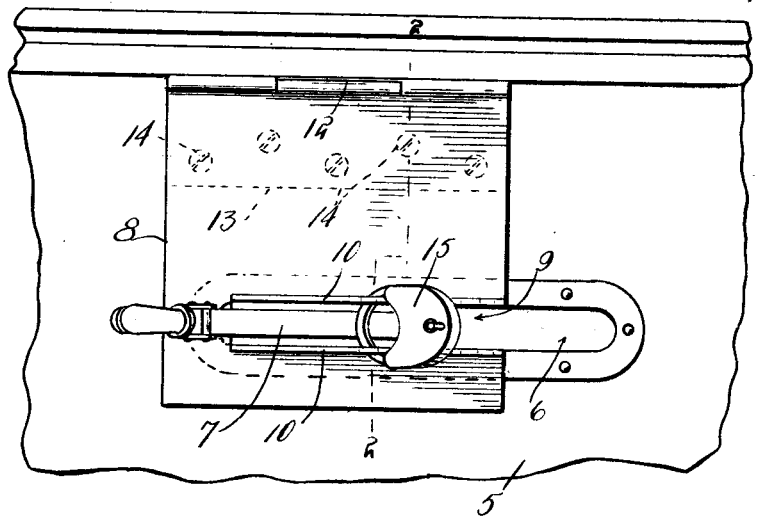
FIG. 1.
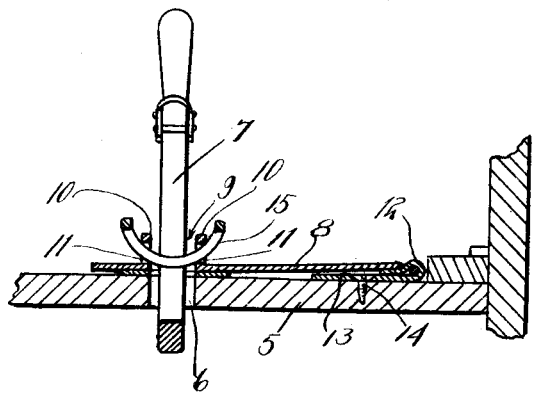
FIG. 2.
FIG. 3.
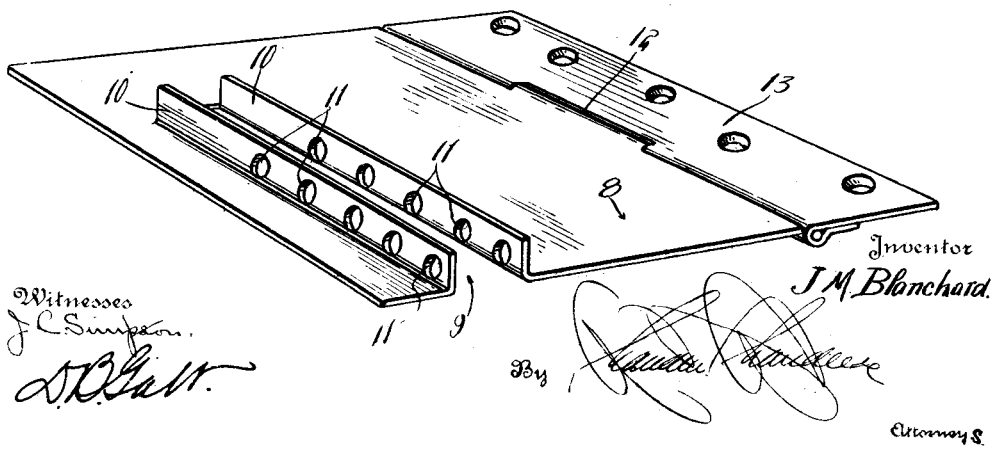
Witnesses
J C Simpson
D O Galt
Inventor
J M Blanchard
By
Attorneys

UNITED STATES PATENT OFFICE.

JESSE M. BLANCHARD, OF McCOOK, NEBRASKA.

LEVER-BRAKE LOCK.

1,185,618.   Specification of Letters Patent.   Patented June 6, 1916.

Application filed February 28, 1916. Serial No. 81,031.

*To all whom it may concern:*

Be it known that I, JESSE M. BLANCHARD, a citizen of the United States, residing at McCook, in the county of Redwillow, State of Nebraska, have invented certain new and useful Improvements in Lever-Brake Locks; and I do hereby declare the following to be a full, clear, and exact description of the invention, such as will enable others skilled in the art to which it appertains to make and use the same.

This invention relates to lever locks, and is adapted particularly for use in connection with brake levers on motor vehicles.

The primary object of the invention is to provide an attachment capable of ready application to motor vehicles now generally in use, by the use of which the brake or operating levers of the vehicle may be conveniently locked in inoperative position.

A further object of the invention is to provide a device of the character thus briefly set forth, which is of simple and extremely inexpensive construction, which may be formed of a single piece of sheet metal, which may be readily applied adjacent a lever without the use of special tools or knowledge, and which will prove thoroughly efficient in preventing the unauthorized use of the vehicle to which it is applied.

With these objects in view, together with others which will appear as the description proceeds, the invention resides in the novel combination and arrangement of parts, all as will be described more fully hereinafter, illustrated in the drawings and particularly pointed out in the claims.

The invention will be best understood by reference to the accompanying drawings, wherein:

Figure 1, is a plan view of the improved lever locking device, shown as applied to a vehicle and in operative position, Fig. 2, is a sectional view taken on line 2—2 of Fig. 1, and Fig. 3, is a detail perspective view of the device removed from the vehicle.

This invention is adapted particularly for use in connection with motor vehicles having a hand lever which, when moved to extreme position in one direction, disconnects the source of power from the drive wheels, and at the same time locks the rear or drive wheels against rotation. A lever of this type is now commonly used on motor vehicles of the Ford make, and while the invention is adapted particularly for use in connection with vehicles of this type, it is to be understood that it is not necessarily so limited, but may with facility be applied to apparatus of different constructions, and having levers operating in different manners and for different purposes.

Referring now more particularly to the drawings, 5 indicates the frame or floor of a conventional form of vehicle, the same being provided with an elongated slot 6 through which an oscillatory control lever 7 projects. The invention resides in the provision of a plate 8 of substantially thin metal, and yet which possesses sufficient strength and rigidity to withstand the strains to which it may be subjected. This plate is provided with a slot 9 extending inwardly from one of its lateral edges, which slot is of a width to permit of the lever 7 passing into the same. Projecting outwardly from the lateral walls of the slot 9 are flanges 10, the said flanges being preferably coextensive with the slot and in spaced parallel relation to each other. Openings 11 are arranged in the flanges 10, the said openings being disposed in spaced relation to each other throughout the length of the flanges, and the openings in the said opposite flanges being alined with each other.

To permit of the ready application of the device to the vehicle, and to permit of the plate 8 being readily swung into and out of proper position, the said plate is hinged as at 12 to a similar plate constituting a body 13, the latter being preferably of restricted dimensions. The plate or body 13 may be provided with suitable openings through which retaining bolts or screws 14 may be inserted to rigidly secure the same to the floor or frame of the vehicle.

It will be observed that the body portion of the device is so secured upon the vehicle frame or floor as to enable the hinged plate 8 to swing toward and away from the lever 7, and when swung in the direction of the said lever, the slot 9 will aline with the slot 6 in the floor of the vehicle to lie in the path traversed by the lever 7. It is also apparent that when swung to operative position, the plate 8 completely covers the body portion 13 of the device, whereby the retaining screws or bolts 14 are protected against being removed.

In use, the lever 7 is moved to the limit of its rearward movement, whereby the engine is disconnected and at the same time the brake mechanism is actuated to lock the rear wheels of the vehicle. A suitable locking member 15 may then be arranged to have its bolt passed through the alined openings in close proximity to and in advance of the lever, whereby the latter will be prevented against forward movement. It will thus be seen that it will be impossible to operate the vehicle from its own power, as the mechanism is locked with the engine disconnected. It is also evident that as the rear wheels are locked, towing of the device will be practically impossible.

From this construction it is apparent that I have provided a device which will prove highly efficient in practice, and yet which may be manufactured and installed at extremely low cost. The nature of the device itself and its manner of application is such as to not impede the operation of the vehicle, and will in no way distract the movements of the vehicle operator.

While I have herein shown and described a particular or preferred embodiment of my invention, I wish it to be understood that I need not confine myself to all the precise details of construction and arrangement of parts herein set forth by way of illustration, as modification and variation may be made without departing from the spirit of the invention or exceeding the scope of the claims.

I claim:

1. In a device of the class described, the combination with a floor having an oscillatory lever projecting therethrough, of a plate arranged upon the floor and adapted to swing into and out of the path traversed by said lever, the said plate being provided with a slot adapted to aline with said lever, flanges projecting outwardly from the side walls of said slot in spaced parallel relation to each other, and the said flanges being provided with means for securing a locking element thereto, substantially as described.

2. In a device of the class described, the combination with a floor having an oscillatory lever projecting therethrough, of a body secured upon the floor and adjacent said lever, a plate hinged to said body and adapted to swing toward and away from said lever, the said plate being provided with a slot extending inwardly from one of the edges thereof, the said slot being adapted to lie in the path traversed by said lever, flanges projecting outwardly from the lateral edges of said slot, and the said flanges being provided with alined openings, substantially as described.

3. As an article of manufacture, a body comprising a plate provided with openings, a plate of equal width with said body and hingedly connected to one edge of the latter, the said hinged plate being adapted to fold upon the body plate and being provided adjacent its free end with a transversely disposed slot projecting inwardly from one of the lateral edges of said plate, flanges projecting outwardly from the opposite longitudinal edges of said slot in spaced parallel relation, and each flange being provided with a longitudinally disposed series of spaced openings, the openings of one flange being alined with those of the other, substantially as described.

In testimony whereof, I affix my signature, in the presence of two witnesses.

JESSE M. BLANCHARD.

Witnesses:
JOHN F. CORDEAL,
S. CORDEAL.